(12) United States Patent
Chen et al.

(10) Patent No.: US 9,428,197 B2
(45) Date of Patent: Aug. 30, 2016

(54) METHOD AND APPARATUS FOR PERSISTENT TRANSFERRABLE CUSTOMIZABLE VEHICLE SETTINGS

(71) Applicant: Ford Global Technologies, LLC, Dearborn, MI (US)

(72) Inventors: Yifan Chen, Ann Arbor, MI (US); Chad Evert Esselink, Canton, MI (US); Basavaraj Tonshal, Northville, MI (US); Tricia Tobolski, Harrison Township, MI (US); Jeffrey Lee Hentschel, Novi, MI (US); Jason Brown, Dearborn, MI (US); Pramita Mitra, Southfield, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 43 days.

(21) Appl. No.: 14/172,484

(22) Filed: Feb. 4, 2014

(65) Prior Publication Data

US 2015/0217780 A1 Aug. 6, 2015

(51) Int. Cl.
*G05D 1/00* (2006.01)
*B60W 50/08* (2012.01)
*B60R 16/037* (2006.01)

(52) U.S. Cl.
CPC .......... *B60W 50/085* (2013.01); *B60R 16/037* (2013.01)

(58) Field of Classification Search
USPC .......................................................... 701/2
See application file for complete search history.

(56) References Cited

U.S. PATENT DOCUMENTS

| | | | |
|---|---|---|---|
| 6,434,450 B1 * | 8/2002 | Griffin et al. ...................... 701/1 |
| 6,812,942 B2 * | 11/2004 | Ribak .............................. 345/30 |
| 2004/0010358 A1 | 1/2004 | Oesterling et al. |
| 2005/0177287 A1 * | 8/2005 | Wang et al. ..................... 701/36 |
| 2007/0068717 A1 * | 3/2007 | Austin et al. ..................... 180/90 |
| 2007/0069880 A1 * | 3/2007 | Best et al. ..................... 340/461 |
| 2010/0127847 A1 * | 5/2010 | Evans et al. ................... 340/461 |
| 2011/0087385 A1 | 4/2011 | Bowden et al. |
| 2011/0175754 A1 * | 7/2011 | Karpinsky ..................... 340/963 |
| 2011/0208339 A1 * | 8/2011 | Tarte et al. ...................... 700/98 |
| 2011/0227942 A1 * | 9/2011 | Fujimoto et al. ............. 345/619 |
| 2013/0151035 A1 | 6/2013 | Park et al. |
| 2013/0154922 A1 * | 6/2013 | Ferren et al. .................. 345/156 |
| 2013/0179029 A1 * | 7/2013 | Wang et al. .................. 701/32.7 |
| 2014/0109075 A1 * | 4/2014 | Hoffman .................... G06F 8/65 717/169 |
| 2014/0200743 A1 * | 7/2014 | Kwon et al. ...................... 701/2 |

\* cited by examiner

*Primary Examiner* — Hussein A. Elchanti
(74) *Attorney, Agent, or Firm* — Jennifer Stec; Brooks Kushman P.C.

(57) ABSTRACT

A system includes a processor configured to receive a user request to edit vehicle feature settings from a computer remote from a vehicle. The processor is also configured to retrieve saved vehicle feature setting configurations associated with a vehicle associated with an identified user account. The processor is further configured to build a current feature setting configuration display. Also, the processor is configured to present a user-configurable version of the display on a user interface. The processor is additionally configured to receive changes to current features setting configurations. The processor is also configured to save the changes and upload the changes to the vehicle.

14 Claims, 6 Drawing Sheets

METHOD AND APPARATUS FOR PERSISTENT TRANSFERRABLE CUSTOMIZABLE VEHICLE SETTINGS

TECHNICAL FIELD

The illustrative embodiments generally relate to a method and apparatus for persistent transferrable customizable vehicle settings.

BACKGROUND

Vehicles come equipped with a wide range of customization options. Radio presets, heating/cooling systems, seat settings, and even custom looks of vehicle displays can all be customized to driver preferences. When a driver moves to a new vehicle, however, the settings must all be reset. Further, after vehicle system updates, settings may not always be in the same state as they were prior to the system update. This can lead to frustration with some drivers.

U.S. Pat. No. 7,283,902 generally relates to a method for transferring at least a first personal setting of a first vehicle to a second vehicle, especially for a driver, who changes the vehicle. To transfer the vehicle settings that are known to the driver as true to the original as possible from a first vehicle to a second vehicle, thus without falsifying the subjective impression, first personalization data indicating the personal first setting is exported from the first vehicle in the original form or in a modified form in a first step and is imported into the second vehicle in a second step. The second personalization data are formed based on the imported data; and a personal setting is carried out with the second personalization data in the second vehicle, wherein the model and/or the accessories of the first and second vehicle may be identical or different.

U.S. Patent Application 2011/0087385 generally relates to an interface system including a vehicle system having an operational data representing a setting of the associated vehicle system and an interface module in communication with the vehicle system to directly modify the operational data of the vehicle system based upon a personalized data, wherein the personalized data is in a platform independent format.

U.S. Patent Application 2013/0151035 generally relates to a vehicle setting sharing system and, more particularly, to a vehicle setting sharing system, which applies vehicle settings, which have been provided for a driver's vehicle, to another person's vehicle as well as to the driver's vehicle to improve the convenience of the driver. The vehicle setting sharing system includes a storage medium configured to store vehicle settings of respective drivers, and a function setting unit configured/structured to receive the vehicle settings of respective drivers from the storage medium and reset functions of a function-executing vehicle based on the stored vehicle settings.

SUMMARY

In a first illustrative embodiment, a system includes a processor configured to receive a user request to edit vehicle feature settings from a computer remote from a vehicle. The processor is also configured to retrieve saved vehicle feature setting configurations associated with a vehicle associated with an identified user account. The processor is further configured to build a current feature setting configuration display. Also, the processor is configured to present a user-configurable version of the display on a user interface. The processor is additionally configured to receive changes to current features setting configurations. The processor is also configured to save the changes and upload the changes to the vehicle.

In a second illustrative embodiment, a system includes a processor configured to perform an update of a vehicle module. The processor is also configured to examine vehicle feature settings for indicia of a setting change resulting from the update, in response to the update. Further, the processor is configured to establish communication with a remote server storing saved feature settings. The processor is additionally configured to download saved feature settings associated with a driver account and, following the update, apply the downloaded saved feature settings to at least vehicle feature settings bearing indicia of a setting change.

In a third illustrative embodiment, a computer-implemented method includes performing an update of a vehicle module. The method also includes examining vehicle feature settings for indicia of a setting change resulting from the update, in response to the update. Further, the method includes establishing communication with a remote server storing saved feature settings. The method additionally includes downloading the saved feature settings associated with a driver account and, following the update, applying the downloaded saved feature settings to at least vehicle feature settings bearing indicia of a setting change.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
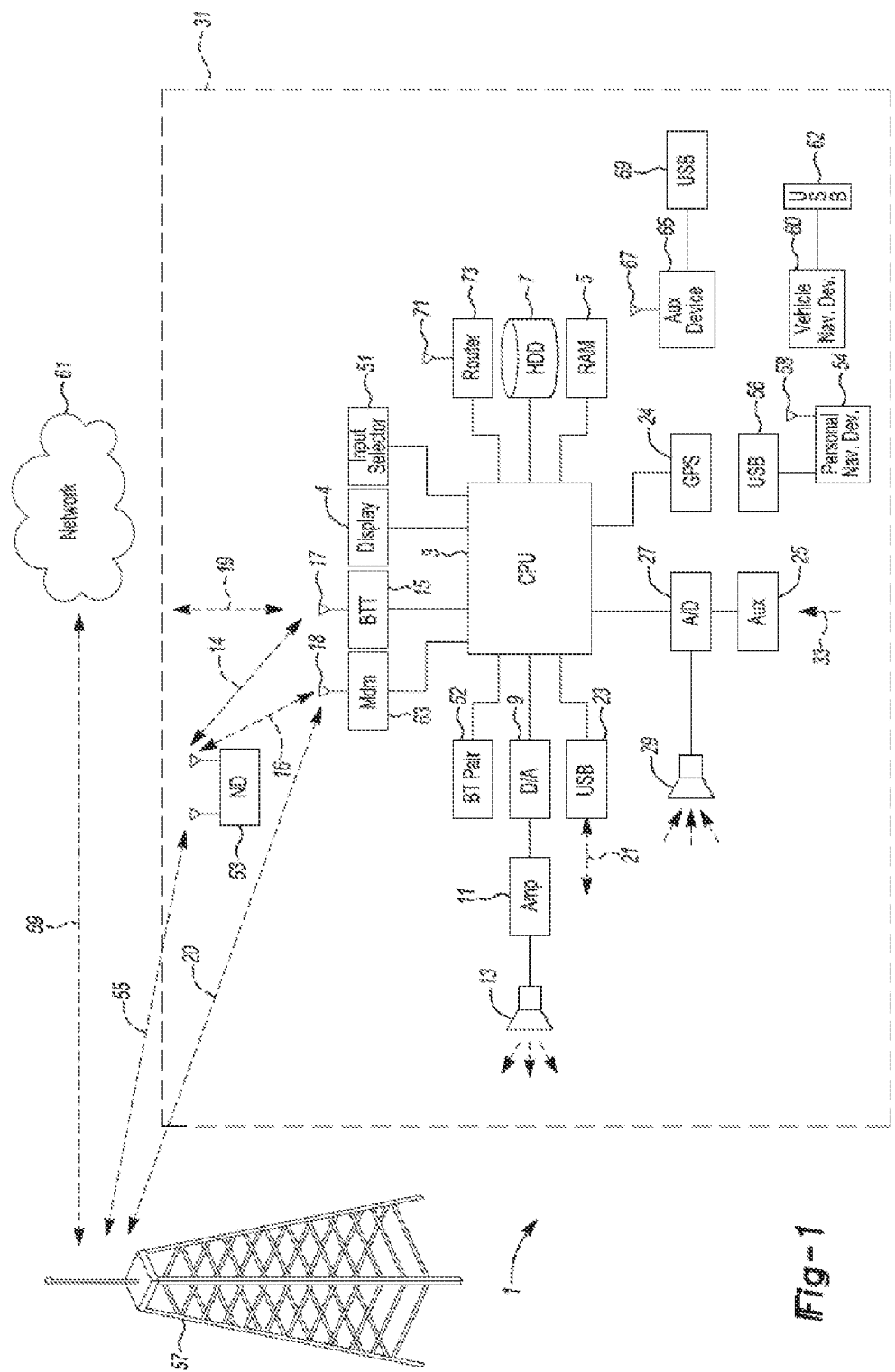
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

With the wide range of customizable options available on vehicles, users can customize the interior settings of a vehicle to a great degree. From radio presets, to seating and steering positions, to a look and feel of an instrument cluster and navigation display, and with respect to many other savable settings, users can spend a good deal of time making an in-vehicle environment as comfortable and user-friendly as possible.

These settings however, are often limited to a single vehicle. When a user purchases, or even rents, a new vehicle, the environment can feel alien and unfamiliar. The user could spend time customizing the new environment, but this can take a while, and, especially for a rental vehicle, can represent a large expenditure of time for use in relatively short duration.

Also, when a vehicle system undergoes an update, that is, one or more hardware or firmware modules have new software loaded thereto, or software is updated, some settings may be erased, and the user may be frustrated when having to reset these settings with every update. This could even cause some users to eschew updating in favor of maintaining current settings.

The illustrative embodiments propose solutions to these and other setting related conundrums.

Figure 2A:
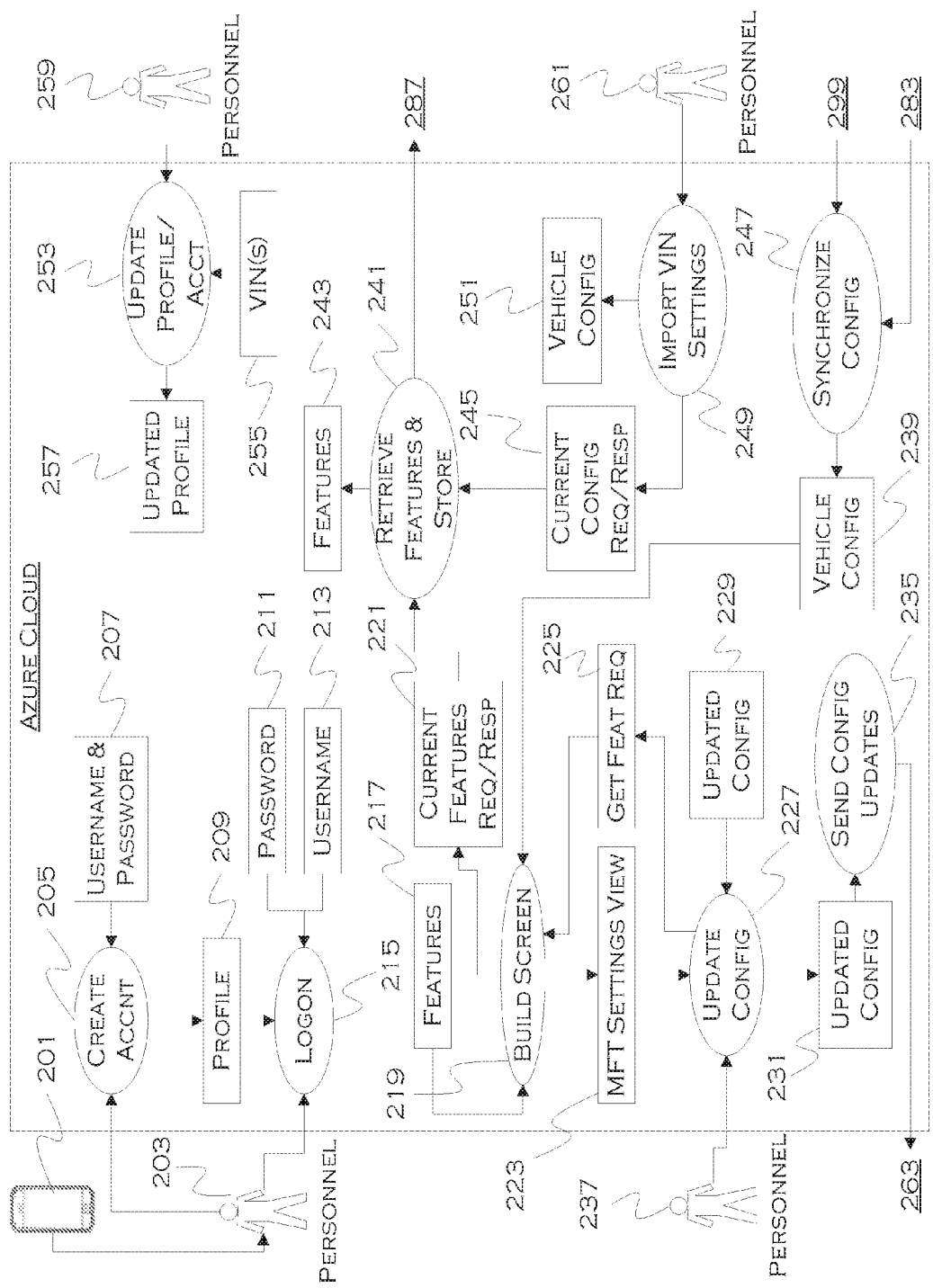
FIGS. 2A-2C show an illustrative example of exemplary systems for practicing illustrative embodiments.
Figure 2B:
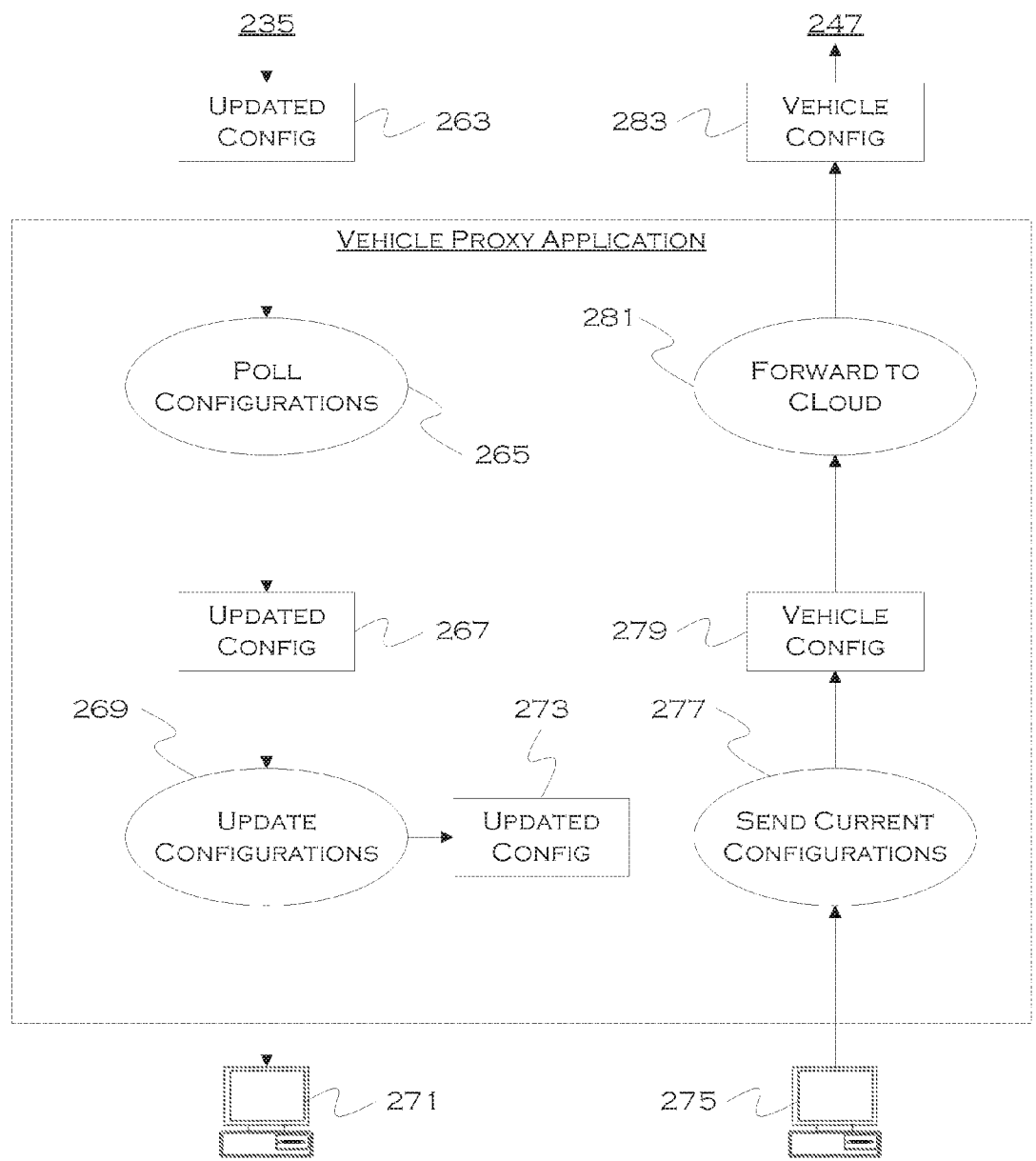
Figure 2C:
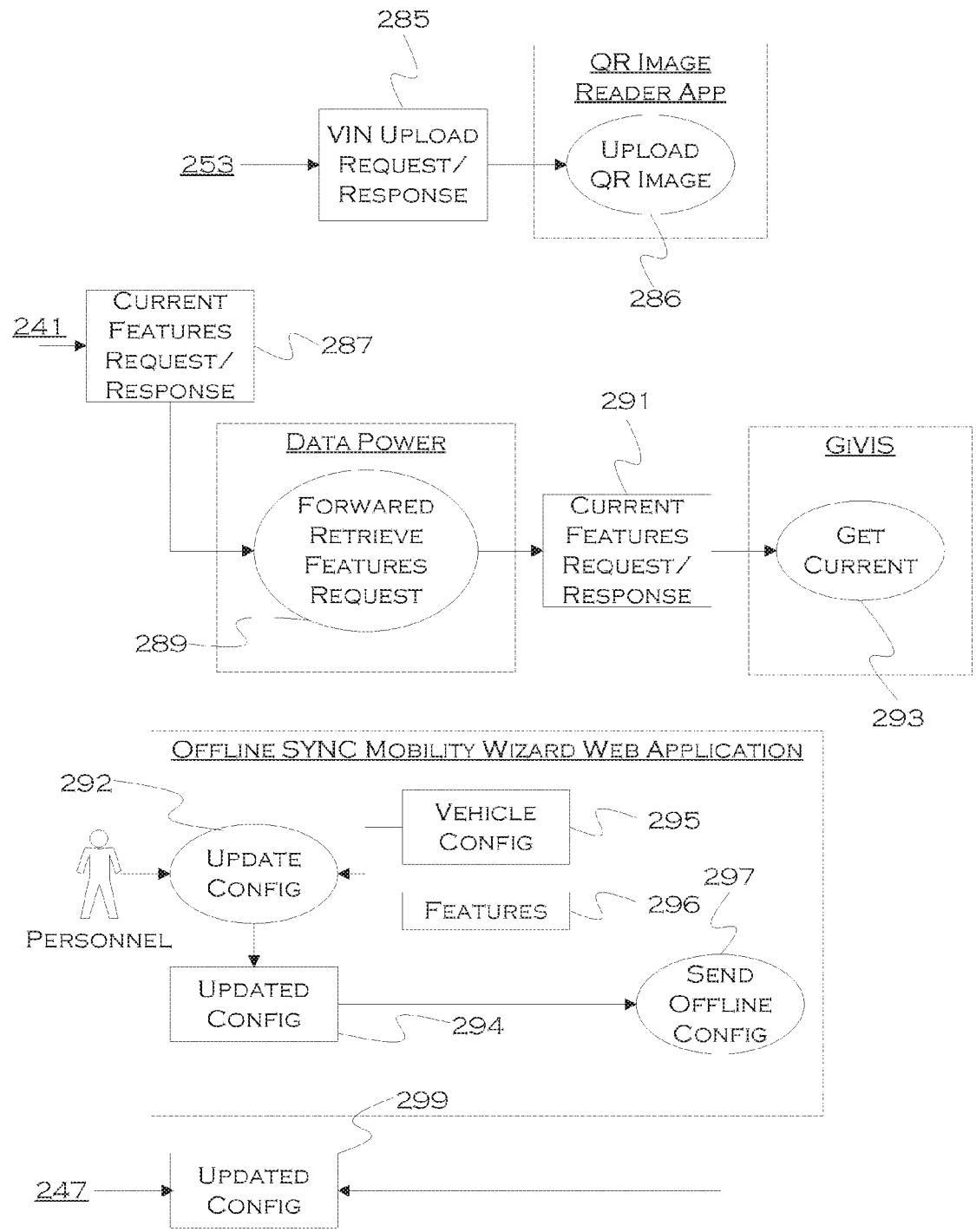

FIGS. 2A-2C show an illustrative example of exemplary systems for practicing illustrative embodiments. Using these illustrative systems, and the exemplary processes presented therewith, users can customize, save, import and export a variety of vehicle system settings. Setting customization can even be performed remote from the vehicle, using an application running on a mobile device, for example.

In the system shown in FIG. 2A, a user 203 uses a mobile device 201 to access the cloud. Initially, if an account has not yet been created, the user may need to create an account 205. The user can use this account to save various vehicles that the user owns, along with accompanying setting information. This account can also be used to reference vehicle settings when an import request is presented. The account is password protected to prevent setting tampering 207, and a user profile 209 may be associated with the account.

If the user has already created an account, or once the account is created, the user will logon to the account 215, which uses input of a username 213 and password 211. Once logged in, the user can access the cloud services available for the vehicle through the mobile device.

For example, in this illustrative embodiment, a user 237 can elect to update/change a vehicle configuration 227. In conjunction with the update configuration request, the user can be shown a variety of information already existing relating to vehicle settings. This setting view 223, representing current vehicle settings and available settings, can be built 219 from a variety of sources.

One source can be a set of current features stored on the cloud 217. This feature set 243 can be updated 241 from several sources. A build-screen request 225 can cause a secondary request 219 to retrieve a current set of features, so that the most updated feature set is stored. The cloud can have a set of current configurations for vehicles stored therein 245. This set can be provided as part of the retrieval.

Additionally, a current vehicle setting profile can be retrieved from a global system such as GIVIS. The retrieval command can send a request for these features and settings, and this will be discussed more with respect to FIG. 2C.

These various information sources can pool together to provide a current set of features 243. This feature set can be accessed 217 and provided to the build-screen process. A set of current features and settings can then be returned to the user for update 227. The user can also customize these settings, based on available features 229 and the customization can be provided to the update request.

Once customization is complete, the process can send updated configurations of settings 231 to an export process 235, which will export the settings to a vehicle proxy application, discussed with respect to FIG. 2B.

In another example of cloud access, a user 261 can request import of vehicle settings 249. This request, in this example, is based on a vehicle identification number (VIN), although it could also use any other suitable identifier. The VIN settings will retrieve configurations for a particular VIN 245, and can provide those settings as a vehicle configuration 251 for the new vehicle.

In still a third access request, the user 259 can update a user account 253. This can include, for example, addition of a vehicle (identified by VIN) 255. Once the vehicle has been added to the account, and any other suitable changes have been made to the account, an updated profile can be stored on the cloud. The profile may also be uploaded 285 (FIG. 2C) as a profile or image of the vehicle 289 settings (FIG. 2C).

FIG. 2B shows an illustrative example of a vehicle proxy application. The application receives an updated vehicle configuration 263 from the cloud, as a result of polling vehicle configurations 265. A user, using a vehicle surrogate computer 271, can use the application to update vehicle configurations 269. The vehicle configurations update 269 can received updated configurations from the polling process 265. Once configured, the updated configurations can be stored 273.

Using the proxy application, users can adjust some or all of the same systems they can adjust in the vehicle. Seat settings, heating/ac settings, radio stations, display interface and/or cluster appearance, and any other customizable settings could be adjusted and saved for a user profile, to be later imported into a vehicle. In one example, a user could even pre-customize a rental or new car, by downloading a stock configuration, editing it as appropriate, and then, when the car is in possession, importing the previously changed settings. So a user on a business trip could configure a rental vehicle on the plane, and could import the settings after renting the vehicle.

After one or more configurations has been updated by a user using a vehicle surrogate machine 275, using the vehicle proxy application, a request can be made to upload the current configuration(s) 277. Any vehicle configurations 279 can be forwarded to the cloud 281, which will send the vehicle configurations 283 to a synchronization process 247. The process 247, will save changed configurations to the appropriate user-associated storage in the cloud.

FIG. 2C shows an example of an offline mobility wizard application that can also be used to update configurations. At some previous point in time, prior to going offline, the device could download a set of features 296 and current configurations of those features 297. This data can be provided to a process for updating configurations 292.

A user possessing the laptop or PC can access the update configurations option, configure the available features as appropriate, and upload updated configurations 294. Once the system is connected to the cloud, the process can send the offline configurations 297. The configurations 299 can be provided to the synchronization process 247 in the cloud.

FIG. 2C also shows other remote systems in communication with the cloud. A request for current feature sets corresponding to a VIN can be sent 287 to a data server 289, which can forward the request to a global system that can provide current features associated with a VIN 293.

In some instances, a user will need to update firmware in a vehicle, requiring an update of one or more vehicle firmware modules. Typically, in an update, new data overwrites all existing data, so that any saved feature settings may no longer be present. To avoid user annoyance, the process may provide the originally configured feature settings (i.e., prior to the update) after an update has been performed.

Figure 3:
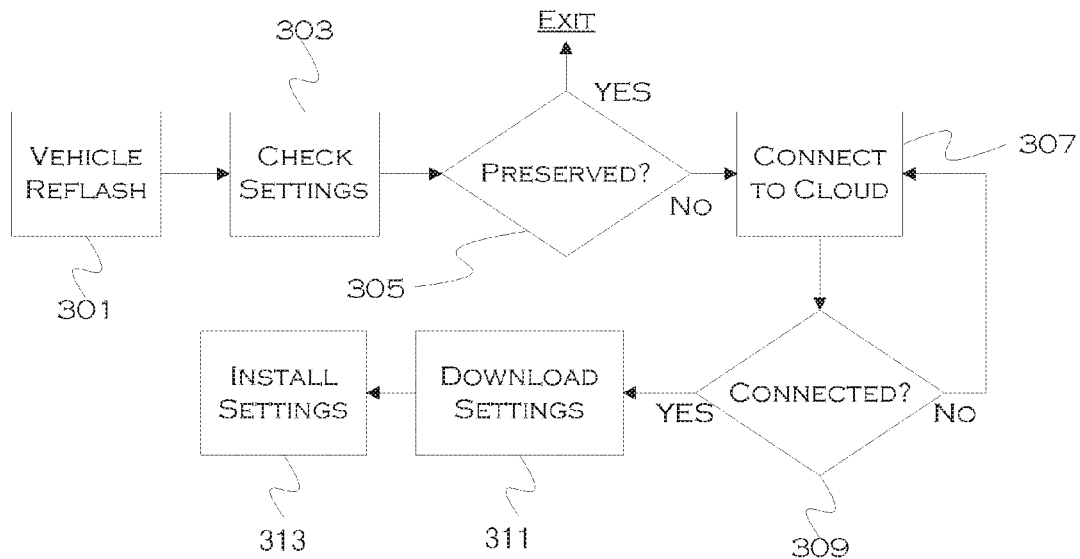
FIG. 3 shows an illustrative process for vehicle update with setting restoration.

FIG. 3 shows an illustrative process for vehicle update with setting restoration. In this example, a vehicle update is performed on one or more vehicle modules 301. Following the update, the process will check the settings of features associated with the module that was updated 303. Additionally or alternatively, all feature settings may be checked. Settings that are set at an OEM original value, or that have other indicia of reversion to original settings, will be indicators that one or more custom settings have been changed, for example. Other suitable methods of determining whether a custom setting has been changed will also be possible.

In another example, the system may simply "assume" that one or more settings was changed by the update, and may automatically import a saved set of settings. If no settings were changed, the importation will not affect anything. In this example, if at least one setting was not preserved 305, the process will connect to the cloud 307 at the earliest opportunity.

Once a connection to the cloud has been established 309, the process can download saved feature settings from the cloud 311. Downloaded settings may then be applied 313. Since feature settings saved to the cloud may represent old settings, the system may use timestamps associated with saved settings to determine which settings to update with the downloaded settings.

For example, if there were three settings, A, B and C, and A was set on Tuesday, B was set on Thursday and C was reset by an update, the system may download settings having been uploaded on Wednesday. These settings would represent an "old" state for B, but the new state for A and C. C would be set in accordance with the settings because it was reset. A would be set because the oldest setting version of A pre-dated the downloaded version. B would not be set, because a change not yet reflected in the uploaded version had occurred.

In another example, the process may simply revert all settings to the downloaded version, or, in yet another example, only "reset" settings may be changed. Also, to avoid the above problem, settings changes may be uploaded to the cloud as they occur and are saved in the vehicle (or on a remote system). This can ensure that no "recent" settings are over-written by a downloaded set of settings.

Figure 4:
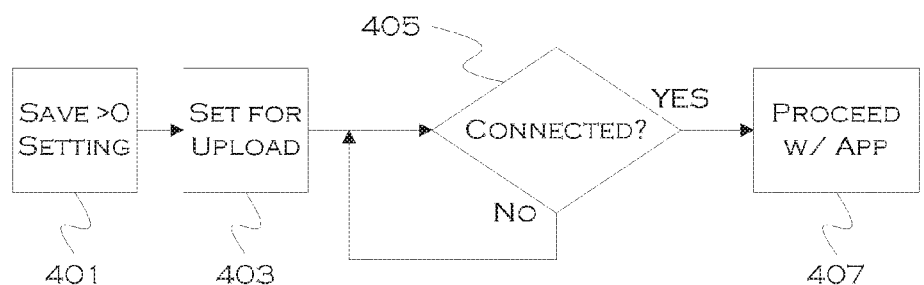
FIG. 4 shows an illustrative process for setting adjustment.

FIG. 4 shows an illustrative process for setting adjustment. In this illustrative example, settings changes are uploaded to the cloud as they are set/saved. This can help avoid issues as those discussed above. In this example, one or more settings has been changed by the driver, and save has been initiated 401. The save may be an actual command to "save," or it may be represented by cessation of setting changing for a period of time, and/or by use of a persistent setting for some predetermined time period (indicating no change will likely be made).

In response to the "save" of a new setting, the process builds a data packet for upload to a server, containing the current vehicle settings (or setting changes) 403. Then, the vehicle waits until a connection to the internet has been established 405. Once the vehicle is online, the process can upload the new settings to the cloud for later retrieval and storage.

Figure 5:
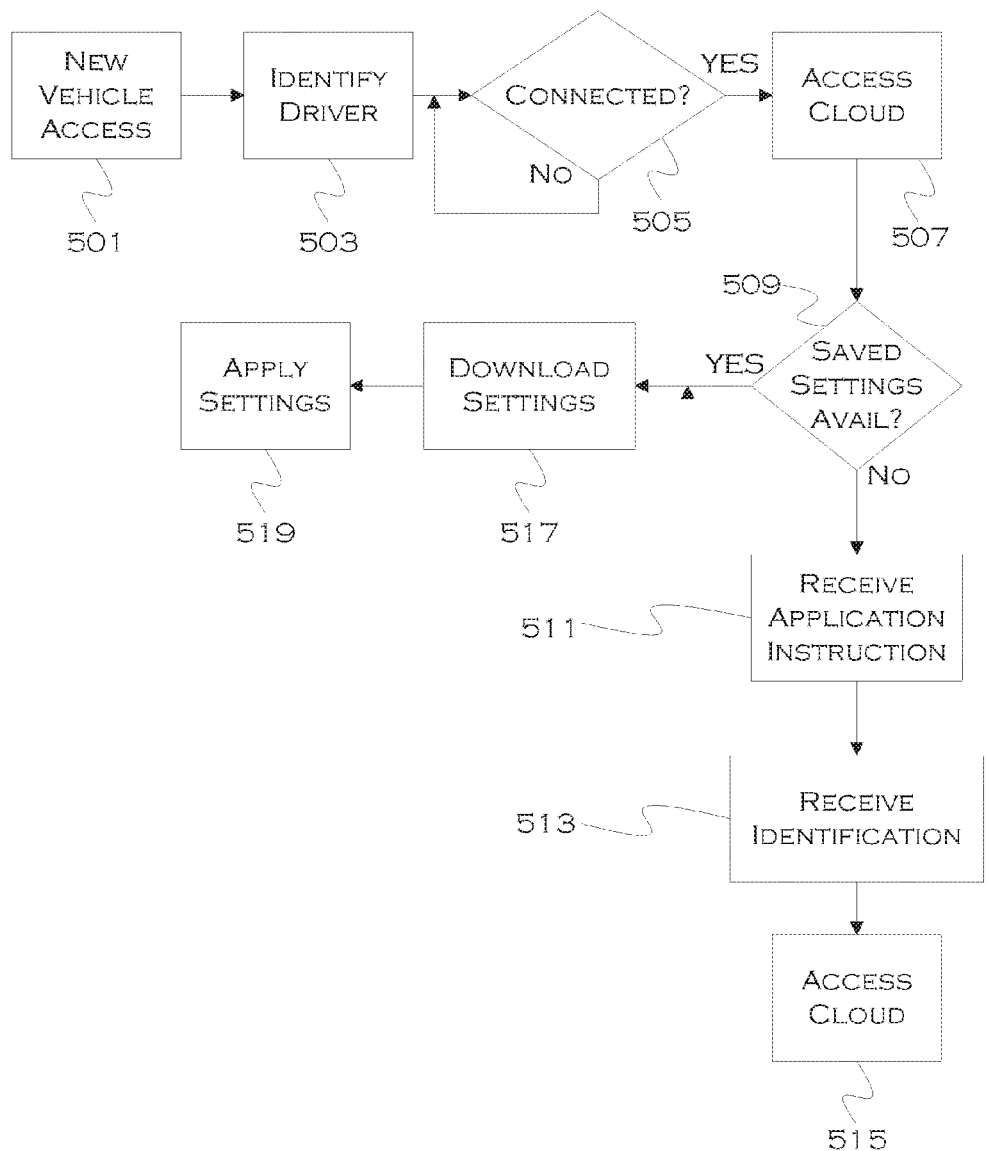
FIG. 5 shows an illustrative process for setting transfer.

FIG. 5 shows an illustrative process for setting transfer. In this example, a user is using a new vehicle to which that user's settings have not yet been applied. This can be, for example, a rental vehicle or a newly purchased vehicle.

Upon new vehicle access 501 (which may be indicated by the driver), the process will identify the driver 503. This identification will be used to identify saved settings for that driver in the cloud. If the vehicle is not connected to the cloud 505, the process will wait until a connection is established.

Once a connection to the cloud is established, the process will access the cloud 507 and determine if stored settings are available for the identified user 509. This process may also determine if any stored settings are appropriate for the current vehicle, or which subset of stored settings is appropriate (e.g., the vehicle has no display, so display settings will be ignored, except for radio presets).

If there are no saved settings identified by the vehicle, the user may still attempt to access an account containing settings the user knows to be saved. In this example, the user launches an application and sends instructions to download settings to the vehicle 511. User identification is provided through the application 513, and cloud access is performed to obtain settings associated with the identified user 515.

Any settings that are available and/or appropriate may be downloaded at this time 517. These settings are applied to the vehicle features 519, or, in some cases, vetted by the vehicle for suitability and then applied to the vehicle features 519.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
perform a vehicle-module version update;
responsive to the update, examine vehicle feature settings to determine any reversion to original equipment manufacturer settings resulting from the update; and
if the vehicle feature settings have reverted:
establish communication with a remote server storing saved feature settings;
download driver-account associated saved feature settings; and
following the update, apply the downloaded saved feature settings to at least reverted vehicle feature settings.

2. The system of claim 1, wherein the processor is configured to examine vehicle feature settings having a defined relationship with an updated module.

3. The system of claim 1, wherein the processor is configured to examine all of the vehicle feature settings.

4. The system of claim 1, wherein the processor is configured to determine that the vehicle feature settings have reverted based on a reset of a last-changed date associated with a setting in vehicle memory.

5. The system of claim 1, wherein the processor is configured to apply the downloaded saved feature settings to all vehicle feature settings.

6. The system of claim 1, wherein the processor is configured to apply the downloaded saved feature settings to all vehicle features settings having a timestamp that predates a timestamp associated with the downloaded saved feature settings.

7. The system of claim 1, wherein the processor is configured to provide a vehicle identifier as part of the communication, and wherein the downloaded save feature settings are downloaded from a saved record associated with the vehicle identifier.

8. A computer-implemented method comprising:
performing a vehicle-module version update ;
responsive to the update, examining vehicle feature settings, via a vehicle computing system (VCS), to determine any reversion to original equipment manufacturer settings resulting from the update;
if the vehicle settings have reverted:
establishing communication with a remote server storing saved feature settings;
downloading driver-account associated saved feature settings, via the VCS; and
following the update, applying the downloaded saved feature settings, using the VCS, to at least reverted vehicle feature settings.

9. The method of claim 8, further comprising examining vehicle feature settings having a defined relationship with a updated module.

10. The method of claim 8, further comprising examining all of the vehicle feature settings.

11. The method of claim 8, wherein the method includes determining a reset of a last-changed date associated with a setting in vehicle memory to determine the reversion of the vehicle feature settings.

12. The method of claim 8, further comprising applying the downloaded saved feature settings to all vehicle feature settings.

13. The method of claim 8, further comprising applying the downloaded saved feature settings to all vehicle features settings having a timestamp that predates a timestamp associated with the downloaded saved feature settings.

14. The method of claim 8, further comprising providing a vehicle identifier as part of the communication, and wherein the downloaded save feature settings are downloaded from a saved record associated with the vehicle identifier.

* * * * *